(12) United States Patent
Nakaie

(10) Patent No.: US 11,570,322 B2
(45) Date of Patent: Jan. 31, 2023

(54) RECORDING MATERIAL TRANSPORTING DEVICE AND IMAGE READING APPARATUS

(71) Applicant: FUJIFILM Business Innovation Corp., Tokyo (JP)

(72) Inventor: Katsuhiko Nakaie, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/460,724

(22) Filed: Aug. 30, 2021

(65) Prior Publication Data

US 2022/0360678 A1    Nov. 10, 2022

(30) Foreign Application Priority Data

May 6, 2021   (JP) .............................. JP2021-078821

(51) Int. Cl.
*H04N 1/00*   (2006.01)
(52) U.S. Cl.
CPC ....... *H04N 1/00801* (2013.01); *H04N 1/0061* (2013.01); *H04N 1/00602* (2013.01)
(58) Field of Classification Search
CPC .... B65G 54/02; B65G 15/34; B65G 2201/02; B65H 31/26; B65H 31/3054; B65H 31/34; B65H 43/06; B65H 5/004; B65H 5/02; B65H 5/021; B65H 5/08; B65H 7/04; B65H 7/08; B65H 83/02; B65H 9/006; B65H 9/04; B65H 9/06; B65H 99/00; B65H 1/02; B65H 1/022; B65H 1/18; B65H 1/26; B65H 11/00; B65H 23/24; B65H 23/32; B65H 2301/164; B65H 2301/212; B65H 2301/3122; B65H 2301/321; B65H 2301/331; B65H 2301/33314; B65H 2301/41522; B65H 2301/4213; B65H 2301/42252; B65H 2301/42254;
(Continued)

(56) References Cited

U.S. PATENT DOCUMENTS 6,061,542 A * 5/2000 Minami ................. G03G 15/01
399/317
6,325,205 B1 * 12/2001 Heyde ...................... A23G 3/22
198/848
(Continued)

FOREIGN PATENT DOCUMENTS

| JP | 2013-082505 A | 5/2013 |
|---|---|---|
| JP | 2013-111946 A | 6/2013 |
| JP | 5937691 B2 | 6/2016 |

*Primary Examiner* — Negussie Worku
(74) *Attorney, Agent, or Firm* — Oliff PLC

(57) ABSTRACT

A recording material transporting device includes a first transport unit that transports a recording material as a target to be transported and a second transport unit that has a transport belt, the transport belt receiving the recording material from the first transport unit and performing transport of the recording material toward a reader that reads an image on the recording material, the transport belt having a transport surface having different friction coefficients in a transport direction that is a direction of the transport and in an intersection direction that is a direction intersecting the transport direction, the friction coefficient in the intersection direction being smaller than the friction coefficient in the transport direction.

9 Claims, 6 Drawing Sheets

(58) Field of Classification Search
CPC .. B65H 2301/44514; B65H 2301/4477; B65H 2301/512125; B65H 2301/51256; B65H 2301/5133; B65H 2301/522; B65H 2402/442; B65H 2402/443; B65H 2402/5152; B65H 2402/544; B65H 2402/545; B65H 2402/60; B65H 2403/00; B65H 2403/40; B65H 2403/512; B65H 2403/731; B65H 2404/133; B65H 2404/14; B65H 2404/1411; B65H 2404/1421; B65H 2404/1424; B65H 2404/1431; B65H 2404/15212; B65H 2404/28; B65H 2404/512; B65H 2404/5211; B65H 2404/52131; B65H 2404/5521; B65H 2404/61; B65H 2404/692; B65H 2405/1113; B65H 2405/1114; B65H 2405/1115; B65H 2405/11151; B65H 2405/1116; B65H 2405/11161; B65H 2405/211; B65H 2405/3321; B65H 2406/111; B65H 2406/122; B65H 2406/36625; B65H 2406/40; B65H 2511/114; B65H 2511/214; B65H 2511/413; B65H 2511/512; B65H 2511/521; B65H 2513/104; B65H 2513/212; B65H 2513/222; B65H 2513/42; B65H 2515/112; B65H 2515/81; B65H 2551/20; B65H 2553/21; B65H 2557/24; B65H 2557/242; B65H 26/06; B65H 2601/2531; B65H 2601/423; B65H 2601/522; B65H 2701/1914; B65H 2701/1928; B65H 2801/09; B65H 29/125; B65H 29/18; B65H 29/245; B65H 3/0607; B65H 3/128; B65H 3/5207; B65H 3/5246; B65H 3/5253; B65H 3/68; B65H 31/3027; B65H 31/3063; B65H 31/3081; B65H 43/08; B65H 45/142; B65H 45/30; B65H 5/068; B65H 7/16; B65H 9/103; B65H 9/106; B65H 9/166; B41M 5/305; B41M 5/3333; B41M 5/3336; B41M 5/3372; B41M 2205/04; B41M 2205/18; B41M 2205/40; B41M 5/0017; B41M 5/0256; B41M 5/035; B41M 5/42; B41M 5/423; B41M 5/426; B41M 7/0017; B41M 7/0027; H04N 1/00602; H04N 1/00631; H04N 1/00572; H04N 1/193; H04N 1/00588; H04N 1/00578; H04N 1/0058; H04N 1/12; H04N 1/00591; H04N 1/0057; H04N 1/203; H04N 1/00628; H04N 1/2032; H04N 1/1215; H04N 1/00567; H04N 1/0062; H04N 1/00615; H04N 1/00681; H04N 2201/0081; H04N 1/00525; H04N 1/00612; H04N 1/00689; H04N 1/00692; H04N 1/00795; H04N 2201/0471; H04N 1/00734; H04N 1/00745; H04N 1/0473; H04N 1/1017; H04N 1/121; H04N 2201/02439; H04N 2201/04794; H04N 1/00604; H04N 1/04; H04N 1/00657; H04N 1/00705; H04N 1/00732; H04N 1/00037; H04N 1/00649; H04N 1/00755; H04N 1/0464; H04N 2201/04741; H04N 2201/04787; H04N 1/00694; H04N 1/00909; H04N 2201/0094; H04N 1/0061; H04N 1/00633; H04N 1/00652; H04N 1/1225; H04N 1/00623; H04N 1/00625; H04N 1/00641; H04N 1/00713; H04N 1/00724; H04N 1/123; H04N 1/1235; H04N 1/405; H04N 2201/04756; H04N 1/00551; H04N 1/00599; H04N 1/00687; H04N 1/00779; H04N 1/00782; H04N 1/00814; H04N 1/047; H04N 1/125; H04N 1/3263; H04N 1/4076; H04N 1/6033; H04N 1/00005; H04N 1/00013; H04N 1/00018; H04N 1/00092; H04N 1/00244; H04N 1/00519; H04N 1/00538; H04N 1/00541; H04N 1/00559; H04N 1/00708; H04N 1/0075; H04N 1/00769; H04N 1/00777; H04N 1/02855; H04N 1/2323; H04N 1/32358; H04N 1/32464; H04N 1/3247; H04N 1/40056; H04N 1/401; H04N 1/4057; H04N 2201/0091; H04N 2201/044; H04N 2201/0458; H04N 2201/047; H04N 2201/04712; H04N 2201/04722; H04N 2201/04731; H04N 2201/04732; H04N 2201/3288; H04N 1/00; H04N 1/00002; H04N 1/00063; H04N 1/00082; H04N 1/00209; H04N 1/0032; H04N 1/00618; H04N 1/00647; H04N 1/00665; H04N 1/00702; H04N 1/00716; H04N 1/00718; H04N 1/00729; H04N 1/00737; H04N 1/0079; H04N 1/00803; H04N 1/00822; H04N 1/00824; H04N 1/00885; H04N 1/00891; H04N 1/00912; H04N 1/00928; H04N 1/02815; H04N 1/02825; H04N 1/0286; H04N 1/1013; H04N 1/1245; H04N 1/192; H04N 1/2307; H04N 1/2369; H04N 1/32133; H04N 1/32138; H04N 1/32609; H04N 1/32619; H04N 1/32662; H04N 1/32667; H04N 1/32673; H04N 1/40087; H04N 1/4051; H04N 1/4055; H04N 1/54; H04N 1/60; H04N 2201/02497; H04N 2201/0434; H04N 2201/3212; H04N 2201/3219; H04N 2201/3223; H04N 2201/327; H04N 2201/3274; H04N 2201/328; H04N 1/00127; H04N 1/0023; H04N 1/00347; H04N 1/0035; H04N 1/00389; H04N 1/00408; H04N 1/00543; H04N 1/00546; H04N 1/00557; H04N 1/00562; H04N 1/00636; H04N 1/0066; H04N 1/0071; H04N 1/0074; H04N 1/00774; H04N 1/00793; H04N 1/00806; H04N 1/00811; H04N 1/00976; H04N 1/00992; H04N 1/00994; H04N 1/028; H04N 1/02835; H04N 1/0284; H04N 1/0287; H04N 1/02885; H04N 1/0289; H04N 1/031; H04N 1/10; H04N 1/1008; H04N 1/1043; H04N 1/1048; H04N 1/1052; H04N 1/107; H04N 1/113; H04N 1/1135; H04N 1/1205; H04N 1/122; H04N 1/124; H04N 1/207; H04N 1/2104; H04N 1/2158; H04N 1/233; H04N 1/4058; H04N 1/407; H04N 1/4072; H04N 1/486; H04N 1/52; H04N 1/56; H04N 1/58; H04N 1/6019; H04N 1/6022; H04N 1/6027; H04N 1/6036; H04N 1/6075; H04N 2201/02404; H04N 2201/02416; H04N 2201/03108; H04N 2201/0422; H04N 2201/0428; H04N 2201/0456; H04N 2201/0464; H04N 2201/04717; H04N 2201/04748; H04N 2201/04755; H04N 2201/04789; H04N 2201/04791; H04N 2201/214; H04N 5/2171; G06K 13/16; G06K 15/16; G06K 1/16; G06K 15/102; G06K 15/14; G06K 2215/006; G06K 7/084

USPC .......................................................... 358/498

See application file for complete search history.

(56) References Cited

U.S. PATENT DOCUMENTS

| | | | |
|---|---|---|---|
| 9,617,077 B2 | 4/2017 | Shoji et al. | |
| 2005/0047804 A1* | 3/2005 | Kosuge | G03G 21/00 |
| | | | 399/346 |
| 2012/0251194 A1* | 10/2012 | Takahashi | G03G 15/1685 |
| | | | 399/302 |
| 2014/0001014 A1* | 1/2014 | Shoji | B65G 15/54 |
| | | | 198/846 |
| 2014/0193167 A1* | 7/2014 | Shinohara | G03G 21/0094 |
| | | | 399/71 |
| 2021/0141330 A1* | 5/2021 | Chonabayashi | G03G 15/6529 |
| 2022/0011708 A1* | 1/2022 | Okubo | B65H 5/38 |
| 2022/0021782 A1* | 1/2022 | Nakaie | H04N 1/122 |
| 2022/0041389 A1* | 2/2022 | Ishioka | B65H 9/006 |
| 2022/0162025 A1* | 5/2022 | Suzuki | B65H 9/006 |

* cited by examiner

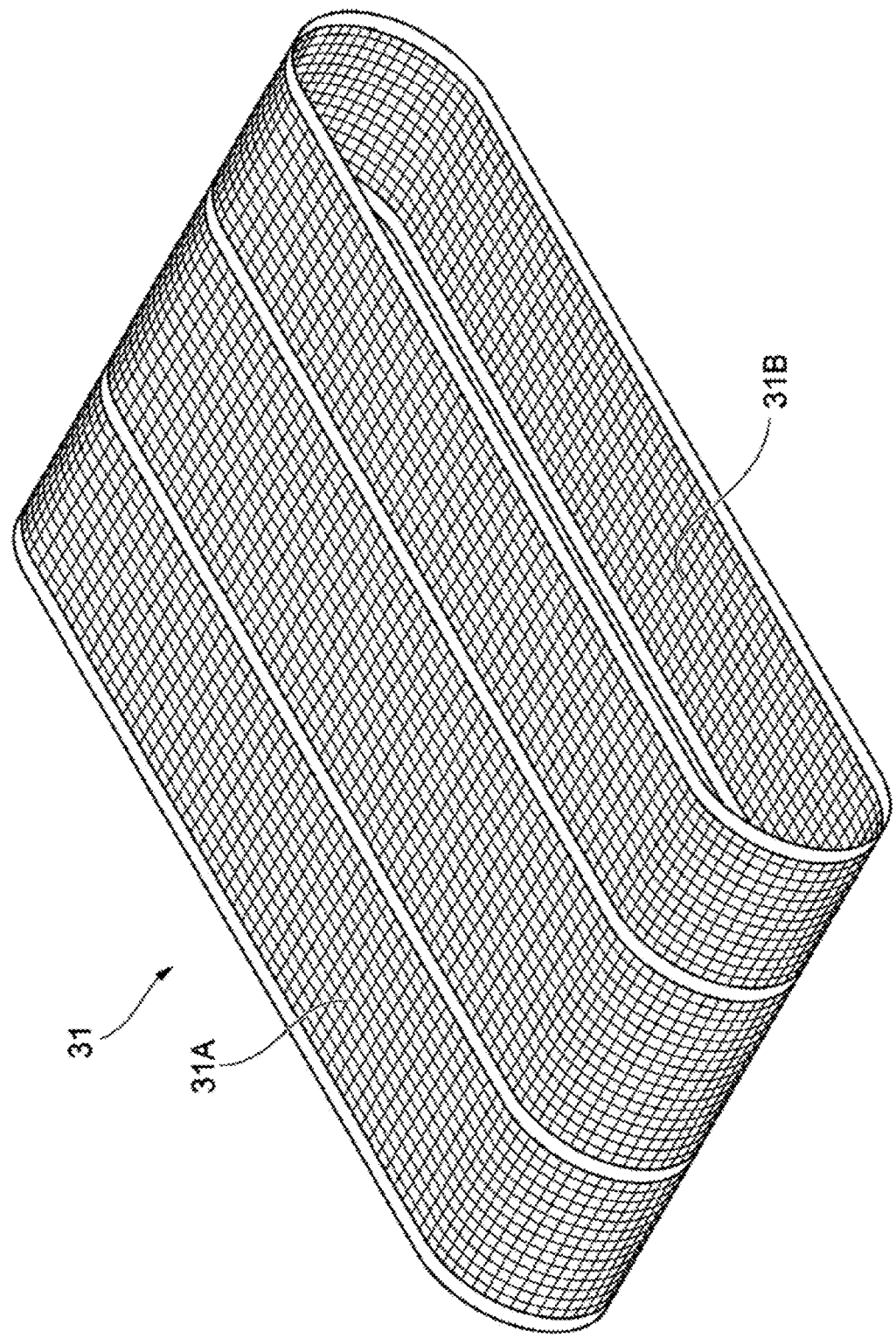

RECORDING MATERIAL TRANSPORTING DEVICE AND IMAGE READING APPARATUS

CROSS-REFERENCE TO RELATED APPLICATIONS

This application is based on and claims priority under 35 USC 119 from Japanese Patent Application No. 2021-078821 filed May 6, 2021.

BACKGROUND

(i) Technical Field

The present disclosure relates to a recording material transporting device and an image reading apparatus.

(ii) Related Art

For example, Japanese Unexamined Patent Application Publication No. 2013-82505 discloses a sheet transporting device that transports sheets by using an endless transport belt.

SUMMARY

Here, when a recording material as a target to be transported is transported by being transferred from a transport unit positioned upstream to a transport unit positioned downstream and if the recording material is not suppressed from being displaced in a direction intersecting the transport direction, the travelling stability of the recording material during such transport is reduced, and, for example, image reading accuracy is hardly increased when reading an image on the recording material that is travelling while being transported.

Aspects of non-limiting embodiments of the present disclosure relate to increasing the image reading accuracy of a recording material that is travelling while being transported, compared with the case where the recording material is not suppressed from being displaced in the direction intersecting the transport direction.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a recording material transporting device including: a first transport unit that transports a recording material as a target to be transported; and a second transport unit that has a transport belt, the transport belt receiving the recording material from the first transport unit and performing transport of the recording material toward a reader that reads an image on the recording material, the transport belt having a transport surface having different friction coefficients in a transport direction that is a direction of the transport and in an intersection direction that is a direction intersecting the transport direction, the friction coefficient in the intersection direction being smaller than the friction coefficient in the transport direction.

BRIEF DESCRIPTION OF THE DRAWINGS

An exemplary embodiment of the present disclosure will be described in detail based on the following figures, wherein:

FIG. 4 illustrates schematically the configuration of a transport belt according to the present exemplary embodiment;

FIG. 5A is a schematic sectional view of the transport belt made of a woven fabric in a first weaving form, FIG. 5B is an enlarged view illustrating a weave with warp and weft in the case illustrated in FIG. 5A, FIG. 5C is a schematic sectional view of the transport belt made of a woven fabric in a second weaving form, and FIG. 5D is an enlarged view illustrating a weave with warp and weft in the case illustrated in FIG. 5C; FIGS. 6A to 6C are in chronological order.

DETAILED DESCRIPTION

Overall Configuration of Image Examining Apparatus 1

Hereinafter, an exemplary embodiment according to the present disclosure will be described in detail with reference to the accompanying drawings.

Figure 1:
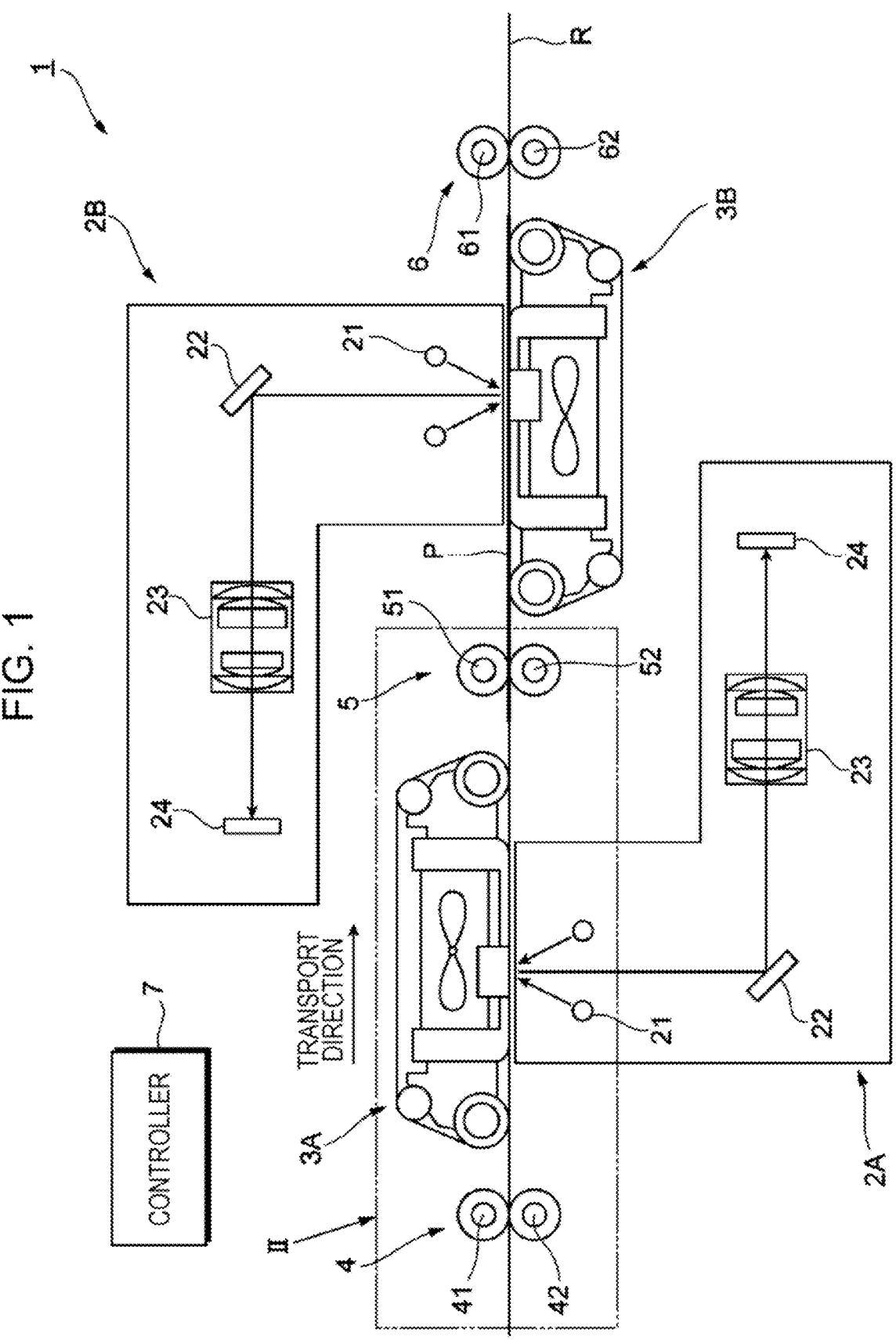
FIG. 1 illustrates schematically the configuration of an image examining apparatus according to the present exemplary embodiment.

FIG. 1 illustrates schematically the configuration of an image examining apparatus 1 according to the present exemplary embodiment.

The image examining apparatus 1, as an example of an image reading apparatus, is used for reading and examining an image formed on a sheet P by an image forming device, which is not illustrated.

The image examining apparatus 1 includes a transport path R on which, as an example of a recording material, a sheet P discharged from the image forming device is transported. In this example, the sheet P is transported on the transport path R from the left side toward the right side of FIG. 1 by, for example, a first sheet-transporting unit 3A and a second sheet-transporting unit 3B, which will be described later. In the following description, on the transport path R, a direction where a sheet P is transported (a direction from the left side toward the right side of FIG. 1) is sometimes referred to as a sheet P transport direction. In addition, a direction (the depth direction of FIG. 1) intersecting the sheet P transport direction is sometimes referred to as the width direction of a sheet P.

The image examining apparatus 1 includes a first reading unit 2A that reads an image formed on one side of the sheet P transported on the transport path R (the lower side of the sheet P in FIG. 1) and a second reading unit 2B that reads an image formed on the other side of the sheet P transported on the transport path R (the upper side of the sheet P in FIG. 1). In the image examining apparatus 1 according to the present exemplary embodiment, the first reading unit 2A and the second reading unit 2B are arranged side by side in the sheet P transport direction on the transport path R. In the present exemplary embodiment, each of the first reading unit 2A and the second reading unit 2B is an example of a reader.

The first reading unit 2A and the second reading unit 2B have similar structures, except for the orientation with respect to the sheet P transported on the transport path R.

Each of the first reading unit 2A and the second reading unit 2B is configured by using a so-called reduction optical system. Specifically, each of the first reading unit 2A and the second reading unit 2B includes a light source 21 that radiates light toward the sheet P, a mirror 22 that reflects the light reflected by the sheet P, an image forming lens 23 that optically reduces the light reflected by the mirror 22 to form an optical image, and an image sensor 24 that converts such an optical image formed by the image forming lens 23 into an electrical signal. In the following description, a region of the sheet P in which the radiated light from the light source 21 is reflected (that is, a region in which an image formed on the sheet P is read) is sometimes referred to as a reading region 20 (refer to FIG. 2).

Each of the first reading unit 2A and the second reading unit 2B is not particularly limited and may be any reading unit capable of reading an image formed on a sheet P. Other than the above-described reduction optical system, for example, a so-called contact optical system using a contact image sensor (CIS) may be adopted.

The image examining apparatus 1 further includes the first sheet-transporting unit 3A and the second sheet-transporting unit 3B. The first sheet-transporting unit 3A is disposed so as to face a reading region 20 of the first reading unit 2A and transports the sheet P toward the reading region 20 of the first reading unit 2A. The second sheet-transporting unit 3B is disposed so as to face a reading region 20 of the second reading unit 2B and transports the sheet P toward the reading region 20 of the second reading unit 2B. In each of the first reading unit 2A and the second reading unit 2B, the sheet P does not stop in the reading region 20, but the image on the sheet P is read during the passage of the sheet P through the reading region 20.

The configurations of the first sheet-transporting unit 3A and the second sheet-transporting unit 3B will be described in detail later.

Moreover, the image examining apparatus 1 includes a first transport roller pair 4 that transports a sheet P discharged from the image forming device toward the first sheet-transporting unit 3A, a second transport roller pair 5 that transports the sheet P transported through the first sheet-transporting unit 3A, toward the second sheet-transporting unit 3B, and a third transport roller pair 6 that transports the sheet P transported through the second sheet-transporting unit 3B, further downstream.

In the present exemplary embodiment, the first transport roller pair 4 is an example of a first transport unit, the first sheet-transporting unit 3A is an example of a second transport unit, and the second transport roller pair 5 is an example of a third transport unit. In addition, the second transport roller pair 5 is an example of the first transport unit, the second sheet-transporting unit 3B is an example of the second transport unit, and the third transport roller pair 6 is an example of the third transport unit.

Moreover, in the present exemplary embodiment, the first transport roller pair 4, the first sheet-transporting unit 3A, and the second transport roller pair 5 are collectively an example of a recording material transporting device. In addition, the second transport roller pair 5, the second sheet-transporting unit 3B, and the third transport roller pair 6 are collectively an example of the recording material transporting device.

The first transport roller pair 4 has a transport roller 41 and a counter roller 42. The transport roller 41 is rotatably driven by a motor, which is not illustrated, in a predetermined direction (the counterclockwise direction in FIG. 1) and transports a sheet P. The counter roller 42 faces the transport roller 41 with the sheet P therebetween and is driven and rotated by the transport roller 41.

Similarly, the second transport roller pair 5 has a transport roller 51 and a counter roller 52. The transport roller 51 is rotatably driven by a motor, which is not illustrated, in a predetermined direction (the counterclockwise direction in FIG. 1) and transports the sheet P. The counter roller 52 faces the transport roller 51 with the sheet P therebetween and is driven and rotated by the transport roller 51.

Moreover, the third transport roller pair 6 has a transport roller 61 and a counter roller 62. The transport roller 61 is rotatably driven by a motor, which is not illustrated, in a predetermined direction (the counterclockwise direction in FIG. 1) and transports the sheet P. The counter roller 62 faces the transport roller 61 with the sheet P therebetween and is driven and rotated by the transport roller 61.

In the present exemplary embodiment, regarding the first transport roller pair 4, the transport roller 41 is an example of a transport roller, and the counter roller 42 is an example of a driven roller. In addition, regarding the second transport roller pair 5, the transport roller 51 is an example of the transport roller, and the counter roller 52 is an example of the driven roller.

The image examining apparatus 1 further includes a controller 7 that controls each part of the image examining apparatus 1.

The controller 7 includes, for example, a central processing unit (CPU), a read-only memory (ROM), and a random access memory (RAM), which are not illustrated. The ROM stores, for example, a basic program (an operation system) executed by the CPU and various settings. The CPU uses the RAM as a working area and executes an application program read from the ROM or a storage unit (not illustrated) such as a semiconductor memory or a hard disc drive (HDD). The following functions of the controller 7 are achieved by the CPU executing such a program.

Image data is input into the controller 7 from the image forming device. In addition, the read data acquired by the first reading unit 2A and the second reading unit 2B is input into the controller 7.

The controller 7 divides each of the image data and the read data into predetermined plural regions and performs pattern matching processing on a regional basis. By such processing being performed, whether a defect occurs in an image formed on the sheet P is examined.

Each of the first transport roller pair 4, the second transport roller pair 5, and the third transport roller pair 6 has an encoder, which is not illustrated, that creates a reference signal for transporting a sheet and reading an image, and the sheet P to be transported from the first transport roller pair 4 to the third transport roller pair 6 is transported at all times by one or adjacent two of the first transport roller pair 4, the second transport roller pair 5, and the third transport roller pair 6.

Configurations of First Sheet-Transporting Unit 3A and Second Sheet-Transporting Unit 3B Subsequently, the configurations of the first sheet-transporting unit 3A and the second sheet-transporting unit 3B will be described.

Figure 2:
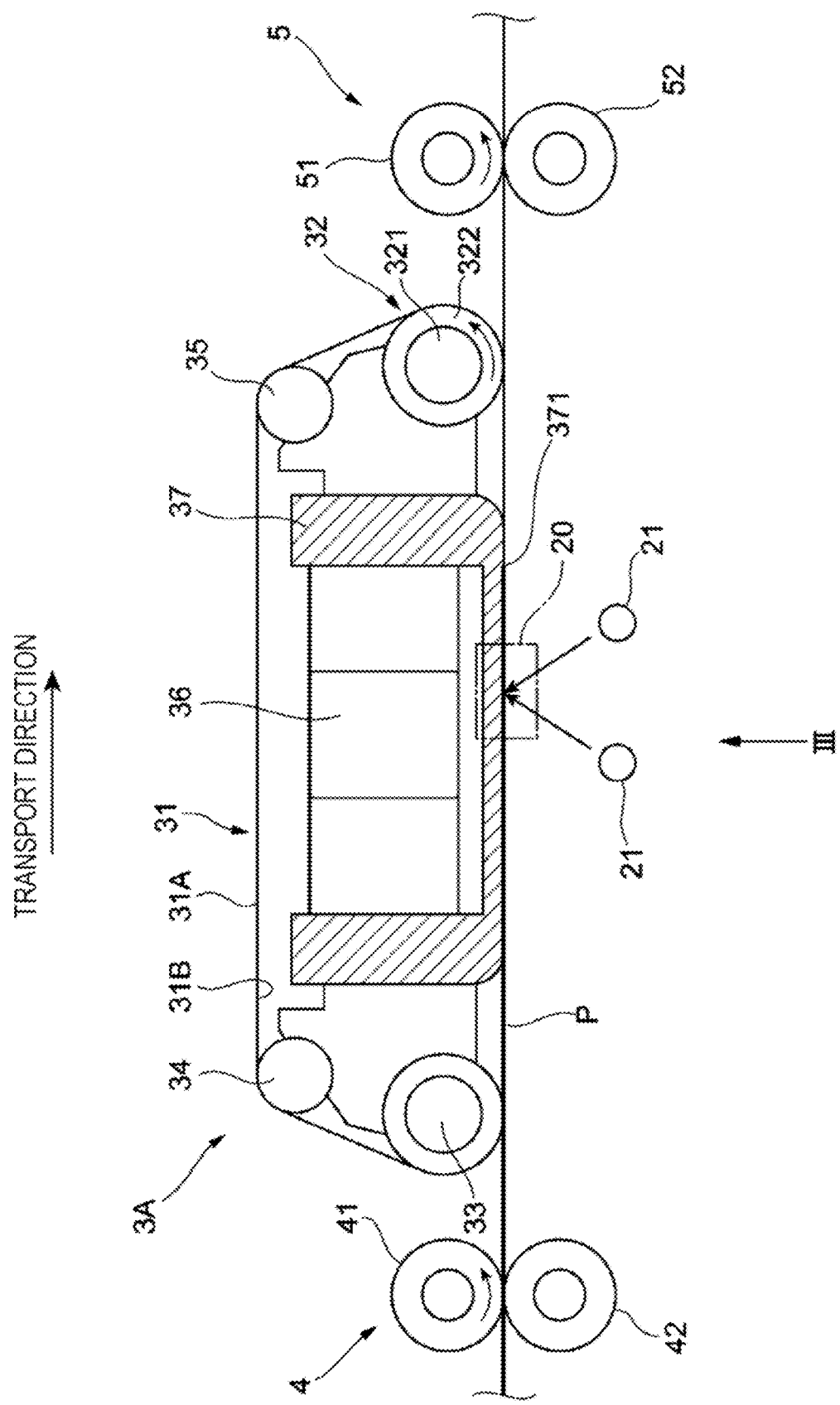
FIG. 2 illustrates the configuration of a first sheet-transporting unit and is an enlarged view of part II in FIG. 1.
Figure 3:
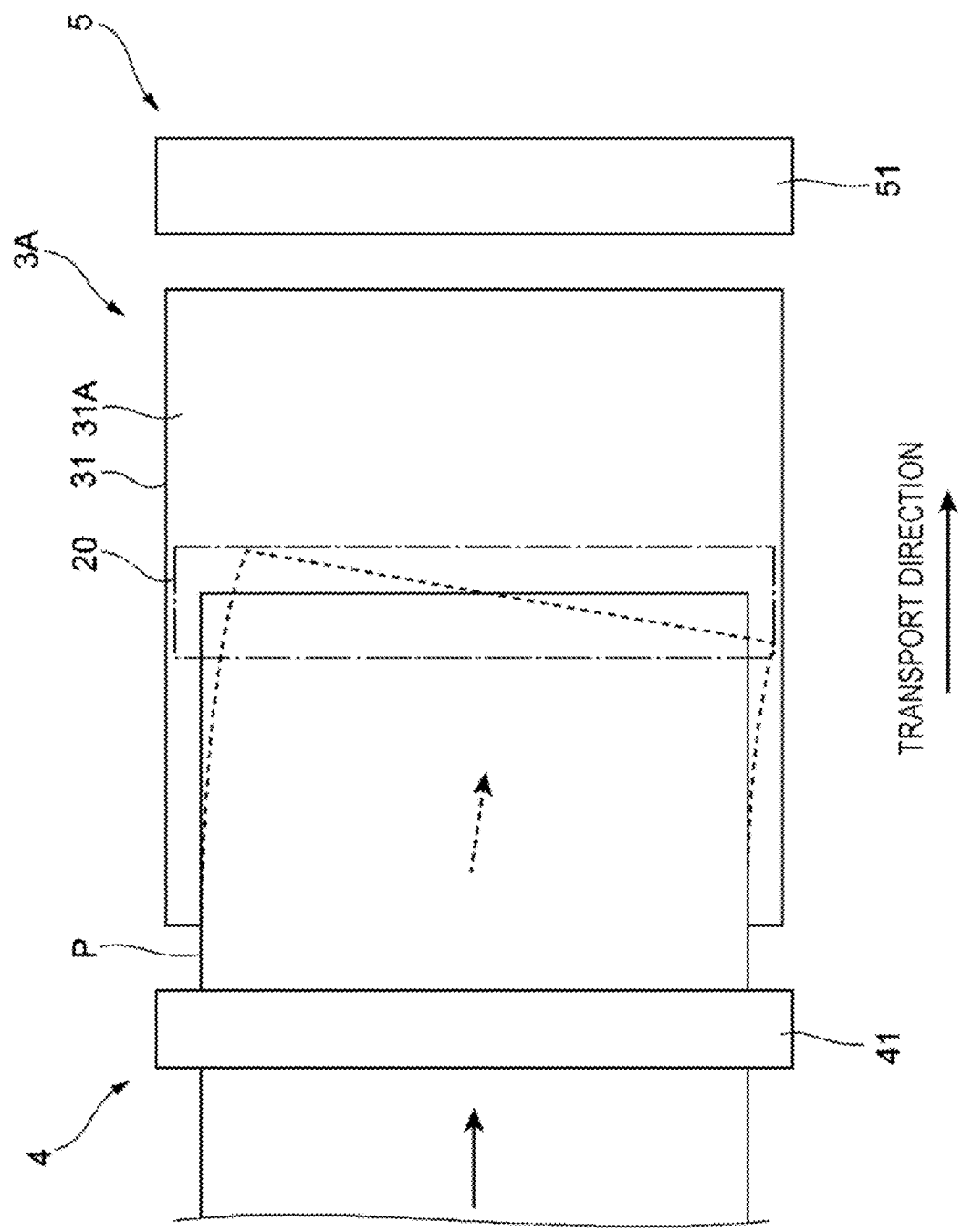
FIG. 3 illustrates the configuration of the first sheet-transporting unit as viewed in direction III in FIG. 2.

FIG. 2 illustrates the configuration of the first sheet-transporting unit 3A and is an enlarged view of part II in FIG. 1. FIG. 3 illustrates the configuration of the first sheet-transport unit 3A as viewed in direction III in FIG. 2. In FIG. 3, illustration of the light source 21 is omitted.

The first sheet-transporting unit 3A and the second sheet-transporting unit 3B have similar structures, except for the orientation with respect to a sheet P transported on the transport path R. The sheet-transporting units will be described by referring to the first sheet-transporting unit 3A as an example. In the following description, in the second sheet-transporting unit 3B, constituents similar to constituents of the first sheet-transporting unit 3A are sometimes described by being given the same references as those given for the constituents of the first sheet-transporting unit 3A.

The first sheet-transporting unit 3A includes an endless transport belt 31 that transports a sheet P while attracting the sheet P, a driving roller 32 that is in contact with an inner peripheral surface 31B of the transport belt 31 and rotated by a motor, which is not illustrated, so as to rotate the transport belt 31, and a following roller 33 that is disposed upstream of the driving roller 32 in the sheet P transport direction, that supports the transport belt 31 while being in contact with the inner peripheral surface 31B of the transport belt 31, and that is driven and rotated by the transport belt 31. The first sheet-transporting unit 3A further includes support rollers 34 and 35 that are in contact with the inner peripheral surface 31B of the transport belt 31 and that support the transport belt 31 with the driving roller 32 and the following roller 33. The first sheet-transporting unit 3A further includes a fan 36 that sucks air to generate airflow flowing from the outer periphery toward the inner periphery of the transport belt 31 and a support member 37 that accommodates the fan 36 and supports the transport belt 31 while being in contact with the inner peripheral surface 31B of the transport belt 31.

Description of Transport Belt 31

The transport belts 31 of the first sheet-transporting unit 3A and the second sheet-transporting unit 3B will be described.

FIG. 4 illustrates schematically the configuration of the transport belt 31 according to the present exemplary embodiment. The transport belt 31 is made of a sheet-shaped material having air permeability with which airflow may pass through the transport belt 31 between the outer peripheral side and the inner peripheral side of the transport belt 31. In this example, as FIG. 4 illustrates, the transport belt 31 has a mesh form having air permeability. More specifically, the transport belt 31 is constituted by a woven fabric woven by using fibers made of a resin such as polyamide. In more detail, the transport belt 31 is a woven fabric woven with warp 71 and weft 72 (refer to FIGS. 5A to 5D). Thus, the required conditions for the transport belt 31 may be easily met.

The form of the transport belt 31 is not limited to such a mesh form and may be any form having air permeability. For example, the transport belt 31 may be, other than a woven fabric, a sheet member having plural through holes with which the outer periphery side and the inner peripheral side communicate with one another, that is, for example, a nonwoven fabric and a rubber belt.

Hereinafter, a direction where the sheet P is transported by the transport belt 31 is sometimes referred to as a transport direction of the transport belt 31, and a direction intersecting the transport direction is sometimes referred to as an intersection direction of the transport belt 31.

Here, in the first sheet-transporting unit 3A and the second sheet-transporting unit 3B that have the above-described attraction transport function and image reading function, the friction coefficient of a surface of the transport belt 31 may be increased to improve the transport efficiency of a sheet P.

However, for example, in the case of the first sheet-transporting unit 3A, the first transport roller pair 4 is positioned upstream of the transport belt 31, and the second transport roller pair 5 is positioned downstream of the transport belt 31. When the transport direction where the transport roller pairs 4 and 5 transport and the transport direction where the transport belt 31 transports are not the same to generate an angular deviation between both the directions, the amount of such a deviation in the intersection direction increases as toward the downstream side of the transport belt 31. Thus, the sheet P may be moved in the intersection direction by the transport belt 31 in the middle of a reading operation performed by using the image reading function. In such a case, it is difficult to perform the reading with high accuracy.

On the other hand, when comparing a deviation of the transport direction caused by the transport roller pairs 4 and 5 and a deviation of the transport direction caused by the transport belt 31 during the transport, the deviation amount of the transport roller pairs 4 and 5 is smaller than the deviation amount of the transport belt 31 due to the structures of the transport roller pairs 4 and 5 and the transport belt 31.

Thus, in the present exemplary embodiment, to address the difficulty in the high-accuracy reading caused by a change of the transport direction due to the transport belt 31, the friction coefficient in the transport direction and the friction coefficient in the intersection direction are caused to differ from one another in a transport surface 311 (refer to FIGS. 5A to 5D) that is a surface on which the sheet P is transported by the transport belt 31, and the transport belt 31 is formed so that, in the transport belt 31, the friction coefficient in the intersection direction is smaller than the friction coefficient in the transport direction.

That is, the frictional force applied, in the intersection direction, to the sheet P by the transport belt 31 is reduced by the friction coefficient in the intersection direction being smaller than the friction coefficient in the transport direction in the transport surface 311 of the transport belt 31. Thus, the sheet P in a state of being transported by the first transport roller pair 4 and the transport belt 31 or by the second transport roller pair 5 and the transport belt 31 is permitted to be displaced in the intersection direction relative to the transport belt 31. Accordingly, even if the transport direction of the transport belt 31 differs from the transport direction of the transport roller pair 4 or the transport roller pair 5, the sheet P may be suppressed from moving in the intersection direction of the transport belt 31, and the high-accuracy reading may thereby be possible.

Hereinafter, a specific configuration of the transport belt 31 will be described.

Figure 5A:
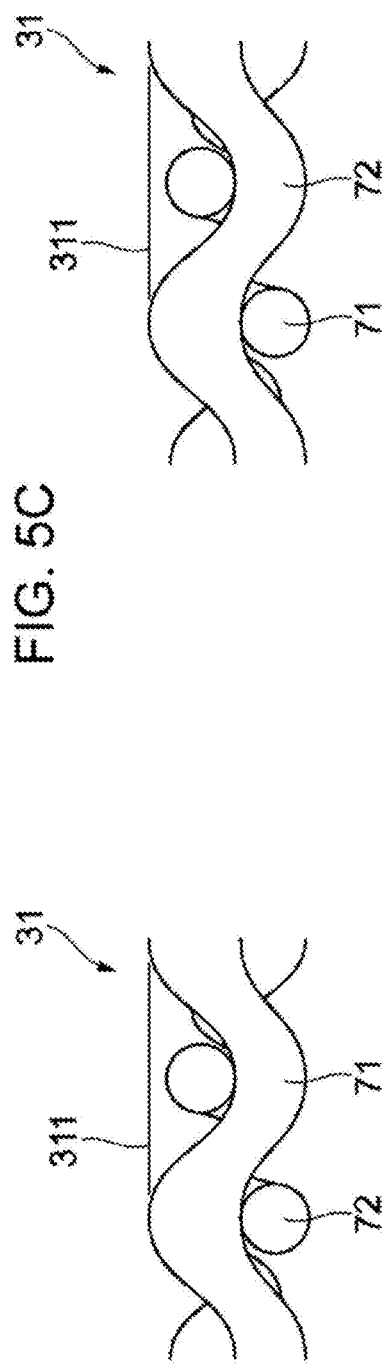
FIGS. 5A, 5B, 5C, and 5D illustrate the case where the transport belt is made of a woven fabric, that is.
Figure 5C:
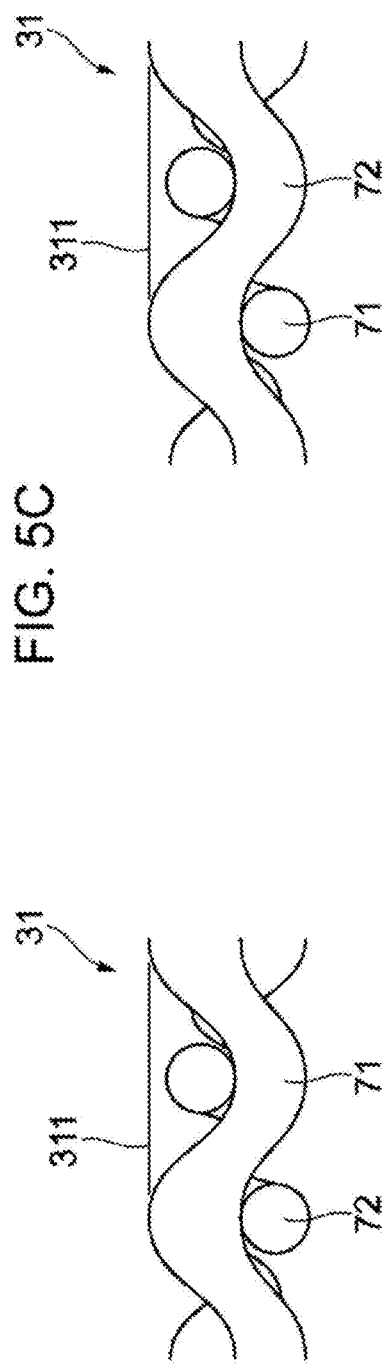
Figure 5D:
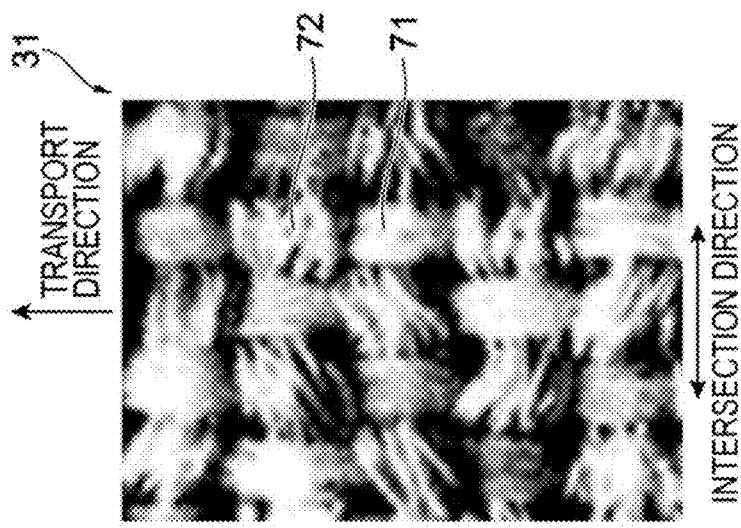
Figure 5B:
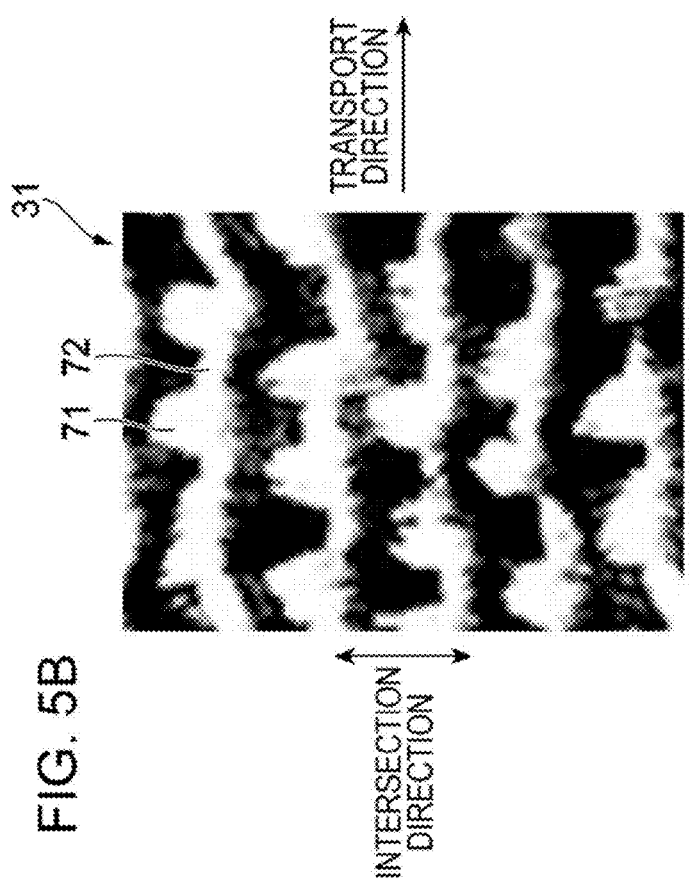

FIGS. 5A, 5B, 5C, and 5D illustrate the case where the transport belt 31 is made of a woven fabric, that is, FIG. 5A is a schematic sectional view of the transport belt 31 made of a woven fabric in a first weaving form, FIG. 5B is an enlarged view illustrating a weave with the warp 71 and the weft 72 in the case illustrated in FIG. 5A, FIG. 5C is a schematic sectional view of the transport belt 31 made of a woven fabric in a second weaving form, and FIG. 5D is an enlarged view illustrating a weave with the warp 71 and the weft 72 in the case illustrated in FIG. 5C.

As FIGS. 5A to 5D illustrate, each of the woven fabrics is a fabric woven in a manner such that the yarns of the warp 71 are aligned and stretched taut, and, between the yarns, each yarn of the weft 72 is woven into. The yarns of the warp 71 and the yarns of the weft 72 intersect one another. The warp 71 means the yarns stretched in the machine direction when the woven fabric is woven. The weft 72 means the yarns inserted in the transverse direction when the woven fabric is woven.

In the woven fabric, the warp 71 is less stretched than the weft 72, thereby being distinguished from the weft 72.

The woven fabrics illustrated in FIGS. 5A to 5D are plain-woven fabrics in which the yarns of the warp 71 and the yarns of the weft 72 alternately cross over. The appearances of the wrinkles of the crepe woven fabrics are substantially similar to one another, and the wrinkles run in a direction parallel to the warp 71.

More specifically, the first weaving form illustrated in FIGS. 5A and 5B is crepe in which the wrinkles appear clearly on a surface by using silk, and the warp 71 has crimps (waves in fibers) larger than the crimps of the weft 72. As FIGS. 5A and 5B illustrate, the warp 71 appears at the surface at a position above the weft 72. Thus, when the transport belt 31 is made of the woven fabric in the first weaving form, it is possible for the warp 71 appearing at the surface to constitute the transport surface 311 of the transport belt 31. In such a case, in the transport surface 311 of the transport belt 31, the friction coefficient in a direction where the weft 72 extends, that is, a direction intersecting a direction where the warp 71 extends, is larger than the friction coefficient in the direction where the warp 71 extends.

Thus, regarding the transport belt 31 of the first weaving form, the direction where the weft 72 extends is the transport direction of the transport belt 31, the direction where the warp 71 extends is the intersection direction of the transport belt 31, and it is thereby possible to realize the above-described "configuration in which, in the transport surface 311, the friction coefficient in the intersection direction is smaller than the friction coefficient in the transport direction."

In addition, the second weaving form illustrated in FIGS. 5C and 5D is a polyester crepe fabric in which the weft 72 has crimps (waves in fibers) larger than the crimps of the warp 71. As FIGS. 5C and 5D illustrate, different from the first weaving form, the weft 72 appears at a surface at a position above the warp 71. Thus, when the transport belt 31 is made of the woven fabric in the second weaving form, it is possible for the weft 72 appearing at the surface to constitute the transport surface 311 of the transport belt 31. In such a case, in the transport surface 311 of the transport belt 31, the friction coefficient in the direction where the warp 71 extends, that is, the direction intersecting the direction where the weft 72 extends, is larger than the friction coefficient in the direction where the weft 72 extends.

Thus, regarding the transport belt 31 of the second weaving form, the direction where the warp 71 extends is the transport direction of the transport belt 31, the direction where the weft 72 extends is the intersection direction of the transport belt 31, and it is thereby possible to realize the above-described "configuration in which, in the transport surface 311, the friction coefficient in the intersection direction is smaller than the friction coefficient in the transport direction."

As described above, in the case where the transport belt 31 is made of the woven fabric in the first weaving form and in the case where the transport belt 31 is made of the woven fabric in the second weaving form, the direction where the warp 71 extends in one case is the same as the direction where the weft 72 extends in the other case, thereby, in both cases, decreasing the friction coefficient in the intersection direction in the transport surface 311 of the transport belt 31.

When the first weaving form is used, the transport direction of the transport belt 31 is the direction where the warp 71, which is less stretched than the weft 72, extends. Thus, the transport belt 31 may be suppressed from stretching in the transport direction of the transport belt 31. In addition, the transport direction is parallel to a warp direction where the warp 71 extends, and the manufacturing costs of the transport belt 31 may thereby be reduced.

When the second weaving form is used, the intersection direction of the transport belt 31 is the warp direction because the transport surface 311 is constituted by the weft 72. That is, the intersection direction of the transport belt 31 is the direction where the warp 71, which is less stretched than the weft 72, extends. Thus, the transport belt 31 may be suppressed from stretching in the intersection direction of the transport belt 31.

Here, in the transport belt 31, the friction coefficient in the transport direction and the friction coefficient in the intersection direction are caused to differ from one another by using the first weaving form and the second weaving form of the woven fabric used for the transport belt 31. However, the method of causing the friction coefficients to differ from one another is not limited to this method, and it may be considered that the friction coefficient in the transport direction and the friction coefficient in the intersection direction in the transport belt 31 are caused to differ from one another by using a woven fabric woven with, for example, the warp 71 and the weft 72 that have different thicknesses.

Other Constituents of First Sheet-Transporting Unit 3A and Second Sheet-Transporting Unit 3B Referring back to FIG. 2, the driving roller 32 has a shaft 321 extending in the width direction and an elastic layer 322 formed on the outer peripheral surface of the shaft 321. The driving roller 32 is rotated by the shaft 321 being rotatably driven in a predetermined direction (in this example, the counterclockwise direction) by a motor, which is not illustrated.

Here, in the present exemplary embodiment, the transport belt 31 is driven by the driving roller 32 that comes into contact with a portion of the inner peripheral surface 31B of the transport belt 31 on the most downstream side in the transport direction. More specifically, the driving roller 32 is in contact with the inner peripheral surface 31B of the transport belt 31, in the transport direction, downstream of the following roller 33 and the support rollers 34 and 35 that all support the transport belt 31 with the driving roller 32. Thus, the transport belt 31 may be suppressed from slackening in a region including the reading region 20 positioned between the following roller 33 and the driving roller 32.

The fan 36 generates the airflow flowing from the outer periphery toward the inner periphery of the transport belt 31 by sucking air. The structure of the fan 36 is not particularly limited, and the fan 36 may have any structure capable of sucking air. For example, a fan such as a sirocco fan or a propeller fan may be used.

The fan 36 is disposed on the inner peripheral side relative to the transport belt 31 so as to face the reading region 20 with the transport belt 31 therebetween. In the first sheet-transporting unit 3A according to the present exemplary embodiment, the fan 36 generates the airflow flowing from the outer periphery toward the inner periphery of the transport belt 31, and an outer peripheral surface 31A of the transport belt 31 thereby attracts a sheet P transported onto the transport belt 31. As described above, the fan 36 is an example of an airflow generator that generates the airflow flowing from the outer periphery toward the inner periphery of the transport belt 31 and brings the sheet P into intimate contact with a portion of the outer peripheral surface 31A of the transport belt 31 facing the reading region 20. Regarding the transport belt 31, the outer peripheral surface 31A of the transport belt 31 faces the reading region 20 with a gap therebetween.

The support member 37 has an elongated shape extending in the width direction intersecting the sheet P transport direction. The support member 37 has a guide surface 371 that is in contact with the inner peripheral surface 31B of the transport belt 31 and guides movement of the transport belt 31. The guide surface 371 is constituted by a flat surface extending in the sheet P transport direction. The guide surface 371 is provided so as to face the first reading unit 2A (refer to FIG. 1) with the transport belt 31 therebetween. More specifically, the guide surface 371 is provided so as to face the first reading unit 2A with a predetermined distance therebetween. Such a distance between the guide surface 371 and the first reading unit 2A is determined in accordance with, for example, a radiating distance of light emitted by the light source 21 of the first reading unit 2A or a focal length of the image forming lens 23.

In addition, the guide surface 371 has plural through holes extending from a side on which the guide surface 371 is in contact with the transport belt 31 to a side on which the guide surface 371 faces the fan 36. Thus, when the fan 36 rotates, air passes through the transport belt 31 and the guide surface 371 and is sucked by the fan 36.

In the first sheet-transporting unit 3A according to the present exemplary embodiment, the position of the guide surface 371 of the support member 37 and the position of the lowest portion of each of the driving roller 32 and the following roller 33 are at the same level. More specifically, in the first sheet-transporting unit 3A, while moving from the following roller 33, passing along the guide surface 371 of the support member 37, and reaching the driving roller 32, the transport belt 31 rotates with the orientation being maintained horizontal with respect to the transport direction. Thus, the sheet P is less likely to rise and separate from the outer peripheral surface 31A of the transport belt 31, and the distance between the first reading unit 2A and one side of the sheet P may be suppressed from fluctuating.

Figure 6A:
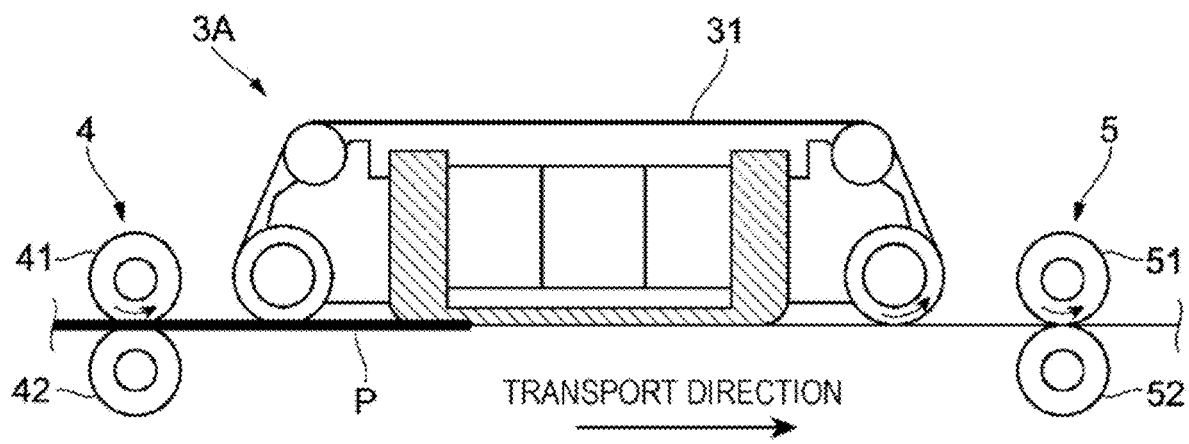
FIGS. 6A, 6B, and 6C illustrate a state where a sheet is transported in a section from a first transport roller pair to a second transport roller pair.
Figure 6B:
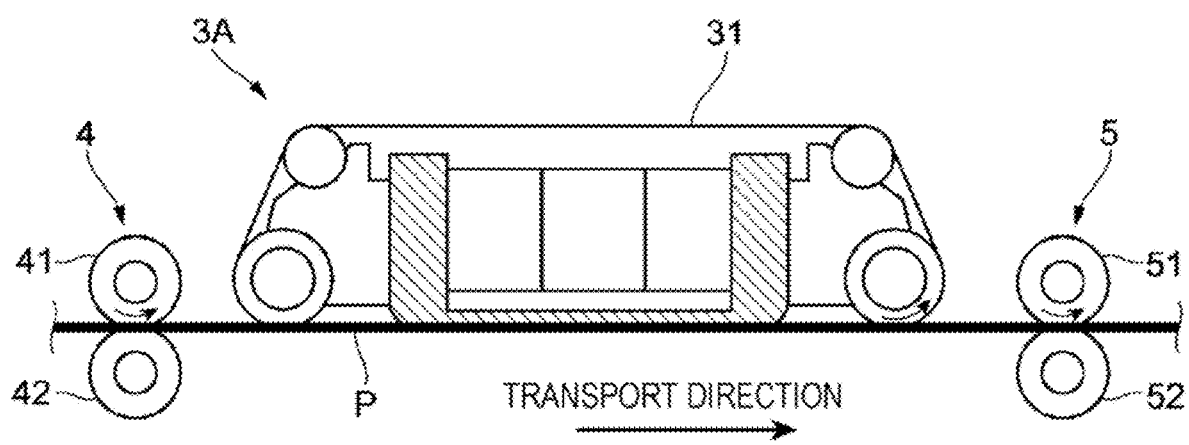
Figure 6C:
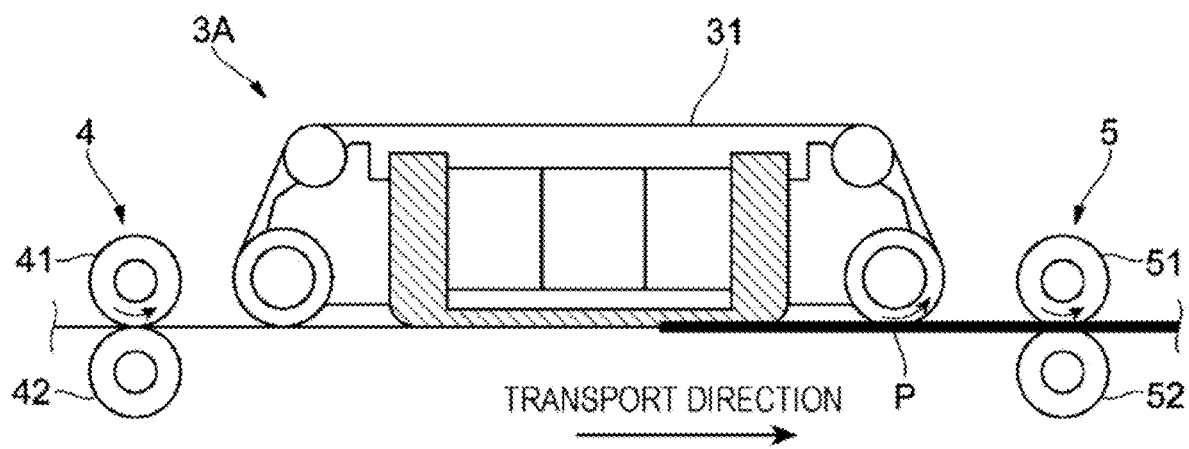

FIGS. 6A, 6B, and 6C illustrate a state where a sheet P is transported in a section from the first transport roller pair 4 to the second transport roller pair 5, and FIGS. 6A to 6C are in chronological order.

As FIG. 6A illustrates, the leading end of the sheet P transported by the first transport roller pair 4 is positioned on the transport surface of the transport belt 31 of the first sheet-transporting unit 3A. The encoder of the first transport roller pair 4, which is not illustrated, creates a reference signal for transporting a sheet and reading an image.

When the sheet P is transported in the transport direction, as FIG. 6B illustrates, the trailing end portion is transported by the first transport roller pair 4, and the leading end portion is transported by the second transport roller pair 5. The encoder of the second transport roller pair 5, which is not illustrated, creates a reference signal for transporting a sheet and reading an image. The frictional force of the first transport roller pair 4 and the frictional force of the second transport roller pair 5 positioned downstream of the first transport roller pair 4 are different, and the frictional force of the second transport roller pair 5 is larger than the frictional force of the first transport roller pair 4.

As described above, in the present exemplary embodiment, the frictional force of the second transport roller pair 5 positioned, in the transport direction, downstream of the first sheet-transporting unit 3A is larger than the frictional force of the transport belt 31 of the first sheet-transporting unit 3A, and the second transport roller pair 5 is positioned apart from the first transport roller pair 4 so as to bring the sheet P into a state of being transported by both the second transport roller pair 5 and the first transport roller pair 4. Thus, the sheet P transported at the first sheet-transporting unit 3A may be suppressed from deviating in the intersection direction.

When the sheet P is further transported, as FIG. 6C illustrates, the trailing end portion is transported by the second transport roller pair 5 and transferred to the next second sheet-transporting unit 3B.

In the second sheet-transporting unit 3B, the frictional force of the third transport roller pair 6 positioned, in the transport direction, downstream of the second sheet-transporting unit 3B is also larger than the frictional force of the transport belt 31 of the second sheet-transporting unit 3B, and the third transport roller pair 6 may be positioned apart from the second transport roller pair 5 so as to bring the sheet P into a state of being transported by both the third transport roller pair 6 and the second transport roller pair 5. Thus, the sheet P transported at the second sheet-transporting unit 3B may be suppressed from deviating in the intersection direction.

Operation of Image Examining Apparatus 1

Subsequently, an operation of the image examining apparatus 1 according to the present exemplary embodiment will be described. When the image examining apparatus 1 examines an image formed on a sheet P, the first transport roller pair 4, the second transport roller pair 5, the third transport roller pair 6, the first sheet-transporting unit 3A, and the second sheet-transporting unit 3B are driven. Specifically, power is supplied to the motors (not illustrated) that drive the transport roller 41 of the first transport roller pair 4, the transport roller 51 of the second transport roller pair 5, and the transport roller 61 of the third transport roller pair 6. Thus, the transport roller 41 of the first transport roller pair 4, the transport roller 51 of the second transport roller pair 5, and the transport roller 61 of the third transport roller pair 6 rotate in a predetermined direction.

In each of the first sheet-transporting unit 3A and the second sheet-transporting unit 3B, power is supplied to the motor (not illustrated) that drives the driving roller 32, and the driving roller 32 rotates in a predetermined direction. Thus, the transport belt 31 rotates in each of the first sheet-transporting unit 3A and the second sheet-transporting unit 3B. Moreover, in each of the first sheet-transporting unit 3A and the second sheet-transporting unit 3B, the fan 36 is rotated by being supplied with power, and air is sucked.

Next, a sheet P on which an image is formed by, for example, the image forming device, which is not illustrated, is delivered to the image examining apparatus 1. The sheet P that has been delivered to the image examining apparatus 1 is transported downstream in the transport direction by the first transport roller pair 4. When the leading end of the sheet P reaches the transport belt 31 of the first sheet-transporting unit 3A, the sheet P is attracted to the outer peripheral surface 31A of the transport belt 31 due to the airflow generated by the fan 36. The sheet P, while being attracted to the outer peripheral surface 31A of the transport belt 31, is then transported further downstream in the transport direction in accordance with the rotation of the transport belt 31.

When the sheet P reaches the reading region 20 in which the first reading unit 2A performs reading, the first reading unit 2A reads an image formed on one side of the sheet P facing the first reading unit 2A (the lower side of the sheet P in FIG. 1). Specifically, the light source 21 of the first reading unit 2A radiates light toward the sheet P, and the reflected light is input into the image sensor 24 via the mirror 22 and via the image forming lens 23. The controller 7 performs the pattern matching processing between the read data that has been input into the image sensor 24 and thus obtained and the image data input from the image forming device, and whether a defect occurs in the image formed on one side of the sheet P is examined.

Here, in the first sheet-transporting unit 3A according to the present exemplary embodiment, when passing through the reading region 20 of the first reading unit 2A, the sheet P is attracted to the outer peripheral surface 31A of the transport belt 31 due to the airflow generated by the fan 36. Thus, the sheet P is less likely to rise and separate from the outer peripheral surface 31A of the transport belt 31, and the distance between the first reading unit 2A and one side of the sheet P may be suppressed from fluctuating, compared with the case where a sheet P is not attracted to the outer peripheral surface 31A of the transport belt 31. Consequently, the accuracy of image reading performed by the first reading unit 2A may be suppressed from decreasing.

Next, the sheet P that has passed the first sheet-transporting unit 3A is transported further downstream of the second transport roller pair 5 in the transport direction. When the leading end of the sheet P reaches the transport belt 31 of the second sheet-transporting unit 3B, the sheet P is attracted to the outer peripheral surface 31A of the transport belt 31 due to the airflow generated by the fan 36. The sheet P, while being attracted to the outer peripheral surface 31A of the transport belt 31, is then transported further downstream in accordance with the rotation of the transport belt 31.

When the sheet P reaches the reading region 20 in which the second reading unit 2B performs the reading, the second reading unit 2B reads an image formed on the other side of the sheet P facing the second reading unit 2B (the upper side of the sheet P in FIG. 1). Specifically, the light source 21 of the second reading unit 2B radiates light toward the sheet P, and the reflected light is input into the image sensor 24 via the mirror 22 and via the image forming lens 23. The controller 7 performs the pattern matching processing between the read data that has been input into the image sensor 24 and thus obtained and the image data input from the image forming device, and whether a defect occurs in the image formed on the other side of the sheet P is examined.

Here, in the second sheet-transporting unit 3B according to the present exemplary embodiment, as with the first sheet-transporting unit 3A, when passing through the reading region 20 of the second reading unit 2B, the sheet P is attracted to the outer peripheral surface 31A of the transport belt 31 due to the airflow generated by the fan 36. Thus, the sheet P is less likely to rise and separate from the outer peripheral surface 31A of the transport belt 31, and the distance between the second reading unit 2B and the other side of the sheet P may be suppressed from fluctuating, compared with the case where a sheet P is not attracted to the outer peripheral surface 31A of the transport belt 31. Consequently, the accuracy of image reading performed by the second reading unit 2B may be suppressed from decreasing.

Subsequently, the sheet P that has passed the second sheet-transporting unit 3B is transported further downstream of the third transport roller pair 6 in the transport direction and discharged from the image examining apparatus 1. Consequently, such a series of processes in the image examining apparatus 1 is finished.

Functions of First Sheet-Transporting Unit 3A and Second Sheet-Transporting Unit 3B

In the image examining apparatus 1 that operates as described above, the direction where the transport belt 31 of the first sheet-transporting unit 3A transports a sheet P may deviate from the direction where the first transport roller pair 4, which transports the sheet P to the transport belt 31, transports the sheet P, and the same applies to the direction where the second sheet-transporting unit 3B transports the sheet P and the direction where the second transport roller pair 5 transports the sheet P.

For example, when the direction where the transport belt 31 of the first sheet-transporting unit 3A transports the sheet P deviates from the direction where the first transport roller pair 4 transports the sheet P, as the broken line in FIG. 3 illustrates, the sheet P that has entered the transport belt 31 area from the first transport roller pair 4 may deviate in the width direction and may be transported while meandering. Consequently, the position of the sheet P with respect to the reading region 20 deviates in the width direction, the accuracy of the image reading performed by the first reading unit 2A decreases, and it may thereby be impossible to examine an image with accuracy.

Although illustration is omitted, a similar problem may arise between the second sheet-transporting unit 3B and the second transport roller pair 5.

For such a problem, in the transport surface 311 of the transport belt 31 (refer to FIGS. 5A to 5D) of the first sheet-transporting unit 3A of the present exemplary embodiment, as described above, the friction coefficient in the intersection direction is smaller than the friction coefficient in the transport direction. Thus, for example, the displacement of the sheet P on the transport surface 311 in the intersection direction is permitted, compared with the case where the friction coefficient in the intersection direction is equal to the friction coefficient in the transport direction or the case where the friction coefficient in the intersection direction is larger than the friction coefficient in the transport direction. In other words, in the transport belt 31, the friction coefficient in the intersection direction is smaller than the friction coefficient in the transport direction, and the sheet P is thereby likely to slide on the transport surface 311 of the transport belt 31 in the intersection direction.

Consequently, on the transport surface 311 of the transport belt 31, the sheet P that has entered the transport belt 31 area from the first transport roller pair 4 is transported in the direction where the first transport roller pair 4 transports the sheet P, when there is a deviation between the direction where the first transport roller pair 4 transports the sheet P and the direction where the transport belt 31 transports the sheet P. Accordingly, the sheet P may be suppressed from deviating with respect to the reading region 20 in the intersection direction while being transported, and the accuracy of the image reading performed by the first reading unit 2A may be suppressed from decreasing.

Similarly, in the second sheet-transporting unit 3B, although illustration is omitted, in the transport surface 311 of the transport belt 31, the friction coefficient in the intersection direction is smaller than the friction coefficient in the transport direction, and, on the transport surface 311 of the transport belt 31, the sheet P that has entered the transport belt 31 area from the second transport roller pair 5 is thereby transported in the direction where the second transport roller pair 5 transports the sheet P. Thus, the sheet P may be suppressed from deviating with respect to the reading region 20 in the intersection direction while being transported, and the accuracy of the image reading performed by the second reading unit 2B may be suppressed from decreasing.

The transport belt 31 according to the present exemplary embodiment is made of a woven fabric woven with the warp 71 and the weft 72 but is not limited to such a woven fabric. The transport belt 31 may be made of a nonwoven fabric or a mesh rubber belt, and a wire material that stretches in the intersection direction may be provided to cause the friction coefficient in the intersection direction to be smaller than the friction coefficient in the transport direction.

Here, in the present exemplary embodiment, the frictional force of the first transport roller pair 4 may be larger than the frictional force of the transport belt 31 of the first sheet-transporting unit 3A. Thus, in the first sheet-transporting unit 3A, the position of the sheet P during the transport may be corrected by the first transport roller pair 4.

Similarly, the frictional force of the second transport roller pair 5 may be larger than the frictional force of the transport belt 31 of the second sheet-transporting unit 3B. Thus, in the second sheet-transporting unit 3B, the position of the sheet P during the transport may be corrected by the second transport roller pair 5.

Note that a frictional force here means a value obtained by multiplying a friction coefficient by a normal reaction.

In addition, in the present exemplary embodiment, the first transport roller pair 4 positioned upstream of the first sheet-transporting unit 3A may be constituted by the transport roller 41 provided to drive and the counter roller 42 that faces the transport roller 41 and is driven by the transport roller 41. Thus, the frictional force may be increased with a simple configuration.

Similarly, the second transport roller pair 5 positioned upstream of the second sheet-transporting unit 3B may be constituted by the transport roller 51 provided to drive and the counter roller 52 that faces the transport roller 51 and is driven by the transport roller 51. Thus, the frictional force may be increased with a simple configuration.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A recording material transporting device comprising:
a first transport unit that transports a recording material as a target to be transported; and
a second transport unit that has a transport belt, the transport belt receiving the recording material from the first transport unit and performing transport of the recording material toward a reader that reads an image on the recording material, the transport belt having a transport surface having different friction coefficients in a transport direction that is a direction of the transport and in an intersection direction that is a direction intersecting the transport direction, the friction coefficient in the intersection direction being smaller than the friction coefficient in the transport direction.

2. The recording material transporting device according to claim 1,
wherein the transport belt of the second transport unit is made of a woven fabric woven with warp and weft.

3. The recording material transporting device according to claim 2,
wherein the weft in the woven fabric constitutes the transport surface of the transport belt by appearing at a surface at a position above the warp, and
wherein the intersection direction of the transport belt is a weft direction where the weft extends.

4. The recording material transporting device according to claim 2,
wherein the warp in the woven fabric constitutes the transport surface of the transport belt by appearing at a surface at a position above the weft, and
wherein the intersection direction of the transport belt is a warp direction where the warp extends.

5. The recording material transporting device according to claim 1,
wherein the first transport unit has a frictional force larger than a frictional force of the transport belt of the second transport unit.

6. The recording material transporting device according to claim 5,
wherein the first transport unit is constituted by a transport roller provided to drive and a driven roller that faces the transport roller and is driven by the transport roller.

7. The recording material transporting device according to claim 1, further comprising:
a third transport unit positioned, in the transport direction, downstream of the second transport unit and having a frictional force larger than a frictional force of the second transport unit,
wherein the third transport unit is positioned apart from the first transport unit so as to bring the recording material into a state of being transported by both the third transport unit and the first transport unit.

8. An image reading apparatus comprising:
a first transport unit that transports a recording material as a target to be transported;
a reader that is disposed, in a transporting direction of the first transport unit, downstream of the first transport unit and reads an image formed on the recording material; and
a second transport unit that has a transport belt, the transport belt receiving the recording material from the first transport unit and performing transport of the recording material toward the reader, the transport belt having a transport surface having different friction coefficients in a transport direction that is a direction of the transport and in an intersection direction that is a direction intersecting the transport direction, the friction coefficient in the intersection direction being smaller than the friction coefficient in the transport direction.

9. A recording material transporting device comprising:
first transport means for transporting a recording material as a target to be transported; and
second transport means that has a transport belt, the transport belt receiving the recording material from the first transport means and performing transport of the recording material toward a reader that reads an image on the recording material, the transport belt having a transport surface having different friction coefficients in a transport direction that is a direction of the transport and in an intersection direction that is a direction intersecting the transport direction, the friction coefficient in the intersection direction being smaller than the friction coefficient in the transport direction.

* * * * *